US012171314B2

(12) United States Patent
Yuan et al.

(10) Patent No.: US 12,171,314 B2
(45) Date of Patent: Dec. 24, 2024

(54) ILLUMINATED WALKING CANE

(71) Applicant: Shenzhen Obuy Technology Co., Ltd, Shenzhen (CN)

(72) Inventors: Qi Yuan, Shenzhen (CN); Shuisheng Jiang, Shenzhen (CN)

(73) Assignee: Shenzhen Obuy Technology Co., Ltd, Shenzhen (CN)

( * ) Notice: Subject to any disclaimer, the term of this patent is extended or adjusted under 35 U.S.C. 154(b) by 219 days.

(21) Appl. No.: 17/944,298

(22) Filed: Sep. 14, 2022

(65) Prior Publication Data

US 2024/0081495 A1 Mar. 14, 2024

(51) Int. Cl.

| | |
|---|---|
| ***A45B 3/04*** | (2006.01) |
| ***A45B 9/02*** | (2006.01) |
| ***F21L 4/00*** | (2006.01) |
| ***F21V 23/04*** | (2006.01) |

(52) U.S. Cl.

CPC .................. *A45B 3/04* (2013.01); *A45B 9/02* (2013.01); *F21L 4/00* (2013.01); *F21V 23/0485* (2013.01); *A45B 2200/05* (2013.01)

(58) Field of Classification Search

CPC ......... A45B 3/04; A45B 9/02; A45B 2200/05; F21L 4/00; F21V 23/0485

USPC .......................................................... 362/102

See application file for complete search history.

(56) References Cited

U.S. PATENT DOCUMENTS

2016/0359348 A1* 12/2016 Xu ........................ H02J 7/0042
2020/0085157 A1* 3/2020 Moyo ...................... A45B 3/02

* cited by examiner

*Primary Examiner* — Elmito Breval
*Assistant Examiner* — Hana S Featherly
(74) *Attorney, Agent, or Firm* — Jeenam Park

(57) ABSTRACT

The present disclosure provides an illuminated walking cane having a cane pole component, a ground-engaging tip at a first end and a handle at an opposing second end, a light mounted on the cane pole component. The handle has a supporting seat with a recessed cavity, a battery assembly with a conductive terminal accommodated in the recessed cavity and an upper cover covering the battery assembly so that the upper shell and the battery assembly form an integral piece which may be grasped by hand and may be detached from the supporting seat. The battery assembly has a bottom shell, a battery unit and a charging port provided on the bottom of the battery assembly. The edge of the bottom shell is supported and connected by the edge of the supporting seat to form a space for receiving the charging port.

14 Claims, 8 Drawing Sheets

ILLUMINATED WALKING CANE

TECHNICAL FIELD

The present application relates generally to a walking aid or other human-powered locomotion and stabilization aid having an illumination source. The walking aid may be used by individuals in recreational activities, as well as by physically challenged individuals engaged in their daily activities. The illuminated walking aid may facilitate moving more safely from one place to another where an individual or group would benefit from seeing the floor, ground, or other surface more clearly, or by being seen more easily by others.

BACKGROUND

Recreational hiking poles and ski poles assist hikers, skiers, skaters, mountain climbers, and search and rescue teams when they need to stabilize themselves and their footing w % bile engaged in such activities. Canes, walkers, crutches, and walking carts similarly provide physically challenged persons and people with physical disabilities with needed stability when moving from one place to another. The value of canes, walkers, hiking poles and similar devices in assisting individuals desiring greater stability correlates directly with how well the ends or tips of the poles, canes, etc. connect with the ground to achieve the desired and required weight-bearing traction and support. When compromised or deficient lighting or visibility conditions exist, whether outside in twilight, at night, or in overcast, or when inside where lighting conditions may be poor, an illuminated cane includes a light emitting diode or similar light source that is supportive of a walking user. The illuminated cane is intended to add a layer of safety to an existing walking assistant, ensuring adequate illumination of a walking path so obstacles and hazards are readily visualized therealong.

A common issue arises when using an illuminated cane in rainy environments or during snowing periods. Since a power source having the battery cells in the cane are located in the cane head area, if water enters the power source, the light emitting diode will be disabled and even more dangerous.

Therefore, it is necessary to provide an illuminated walking cane with waterproof function to solve the issues.

SUMMARY

In view of this, the present disclosure is designed to provide an illuminated walking cane suitable for all-weather for assisting movement.

An illuminated walking cane includes a cane pole component having a ground-engaging tip at a first end and a handle at an opposing second end, a light mounted on the cane pole component. The handle has a supporting seat with a recessed cavity, a battery assembly with a conductive terminal accommodated in the recessed cavity and an upper cover covering the battery assembly so that the upper shell and the battery assembly form an integral piece which may be grasped by hand and may be detached from the supporting seat. A power-pressing indicating button is provided on the top surface of the upper shell. The battery assembly has a bottom shell, a battery unit and a charging port provided on the bottom of the battery assembly. The edge of the bottom shell is supported and connected by the edge of the supporting seat to form a space for receiving the charging port.

In another aspect, the upper shell has a main portion and an auxiliary portion matched with the main portion, the power-pressing indicating button is provided on the auxiliary portion.

In another aspect, the auxiliary portion includes a covering portion, a buckle portion which may be buckled in the central area of the main portion, and a bridge extending between the covering portion and the buckle portion, the power-pressing indicating button is provided the covering portion.

In another aspect, the covering portion and the buckle portion are arranged on one side of the main portion, the bridge is arranged on the other side of the main portion, and the covering portion and the buckle portion take the bridge as a stress fulcrum.

In another aspect, the battery assembly further has a touch switcher provided on one side of the battery unit, a PCBA with the charging port provided on the other side of the battery unit, a FPC extending between the touch switcher and the PCBA.

In another aspect, the touch switcher is located under the power-pressing indicating button so that the touch switcher may be triggered by hand via the power-pressing indicating button.

In another aspect, the bottom shell is in the shaped of a hull.

In another aspect, a plate is arranged in the recessed cavity of the supporting seat and facing the charging port.

In another aspect, a flexible lead with metal terminal is mounted on the plate, the conductive terminal of the battery assembly is elastically and electrically connected with the metal terminals of the flexible lead.

In another aspect, an elastic metal buckle is provided in the recessed cavity of the supporting seat for hooking one side of the battery assembly.

In another aspect, the elastic metal buckle has a base mounted on the main shell of the battery assembly, an elastic arm extending upward from the base and a barb provided at the end of the elastic arm.

In another aspect, a groove is provided on the edge of the bottom shell of the battery assembly for accommodating the elastic arm to pass through.

In another aspect, a gap corresponding to the groove is provided on the upper shell for accommodating the elastic metal buckle.

In another aspect, the main shell is further provided with an elastic pressing member which may elastically resist the elastic arm of the elastic metal buckle so that the elastic metal buckle is detached from the battery assembly.

In another aspect, a narrow shed extends from the main shell to form a mouth arranged on the main shell for a portion of the battery assembly.

In another aspect, the arrow shed extends from the edge of main shell away from the elastic metal buckle for forming the mouth.

In the present disclosure, the battery assembly and the elongate pole are detachably arranged, and the charging port of the battery assembly is hidden inside the handle when the battery component supplies power, so that external rainwater is not easy to enter the battery assembly through the charging port, which improves the safety performance and service life of the cane.

BRIEF DESCRIPTION OF DRAWINGS

Many aspects of the embodiments can be better understood with reference to the following drawings. The components in the drawings are not necessarily drawn to scale, the emphasis instead being placed upon clearly illustrating the principles of the embodiment.

DETAILED DESCRIPTION

Figure 1:
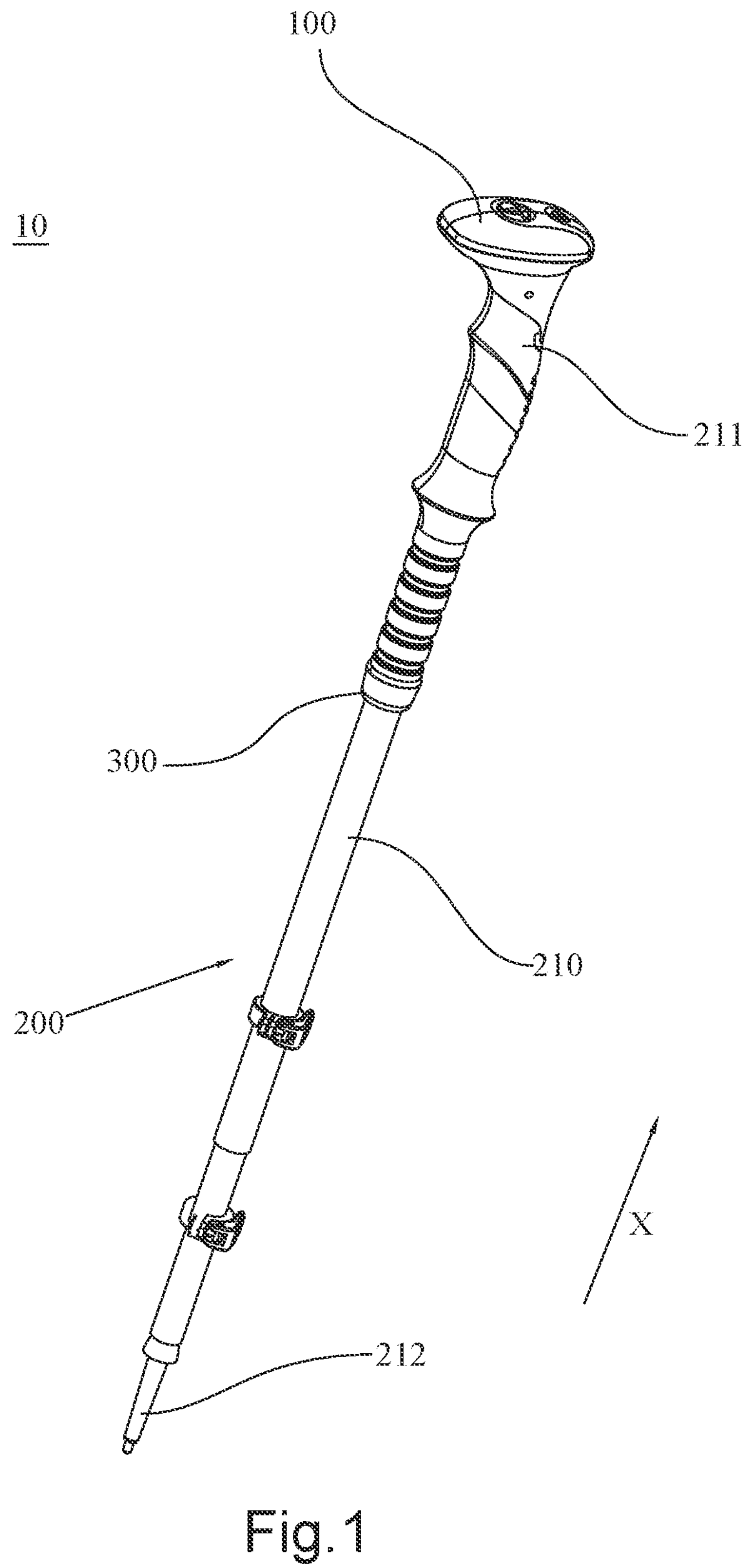
FIG. 1 is an isometric view of an illuminated walking cane in accordance with an exemplary embodiment of the present disclosure.
Figure 2:
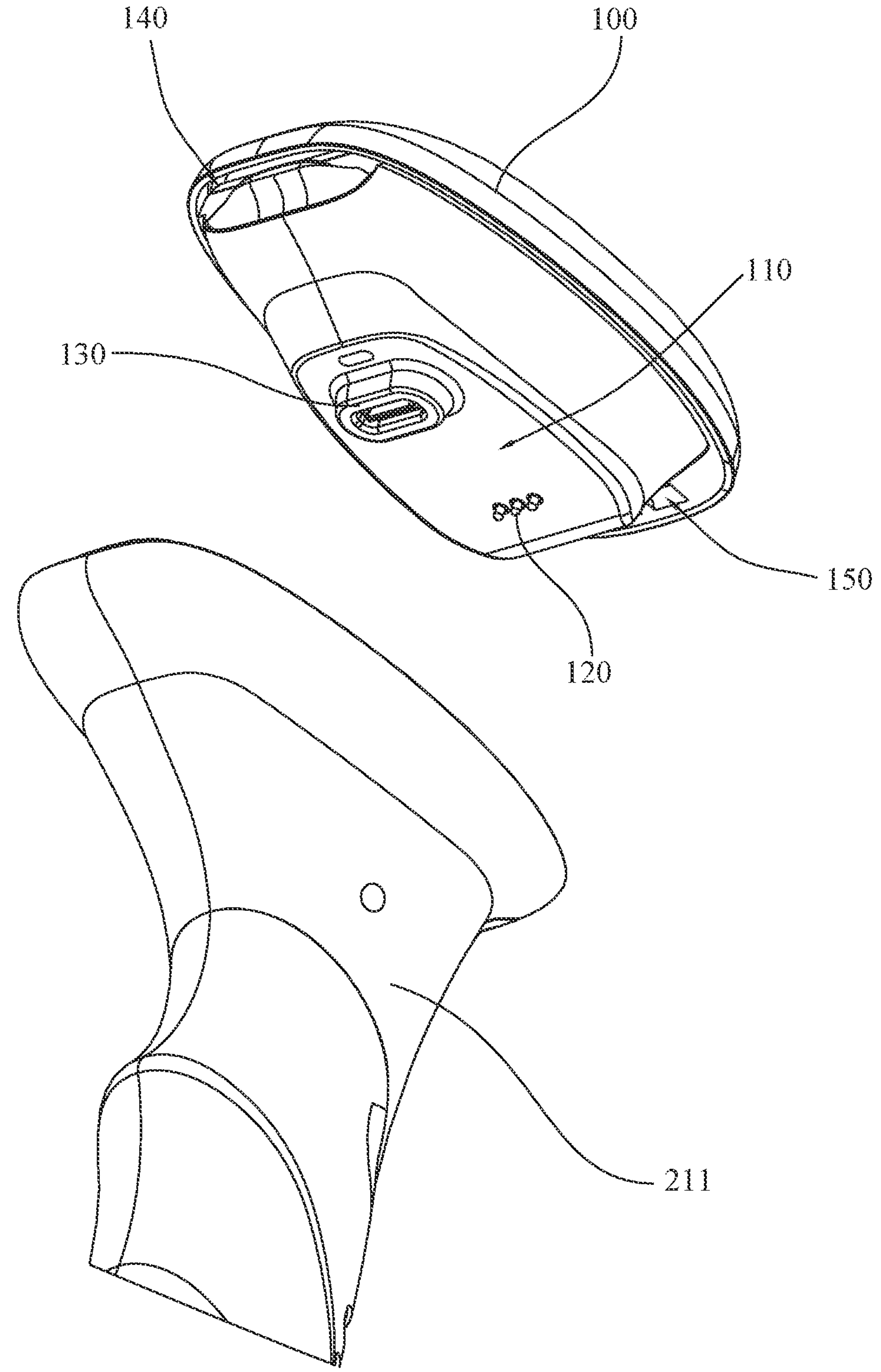
FIG. 2 is an isometric exploded view of a handle of the illuminated walking cane in FIG. 1, with the cane pole component thereof being removed away.
Figure 3:
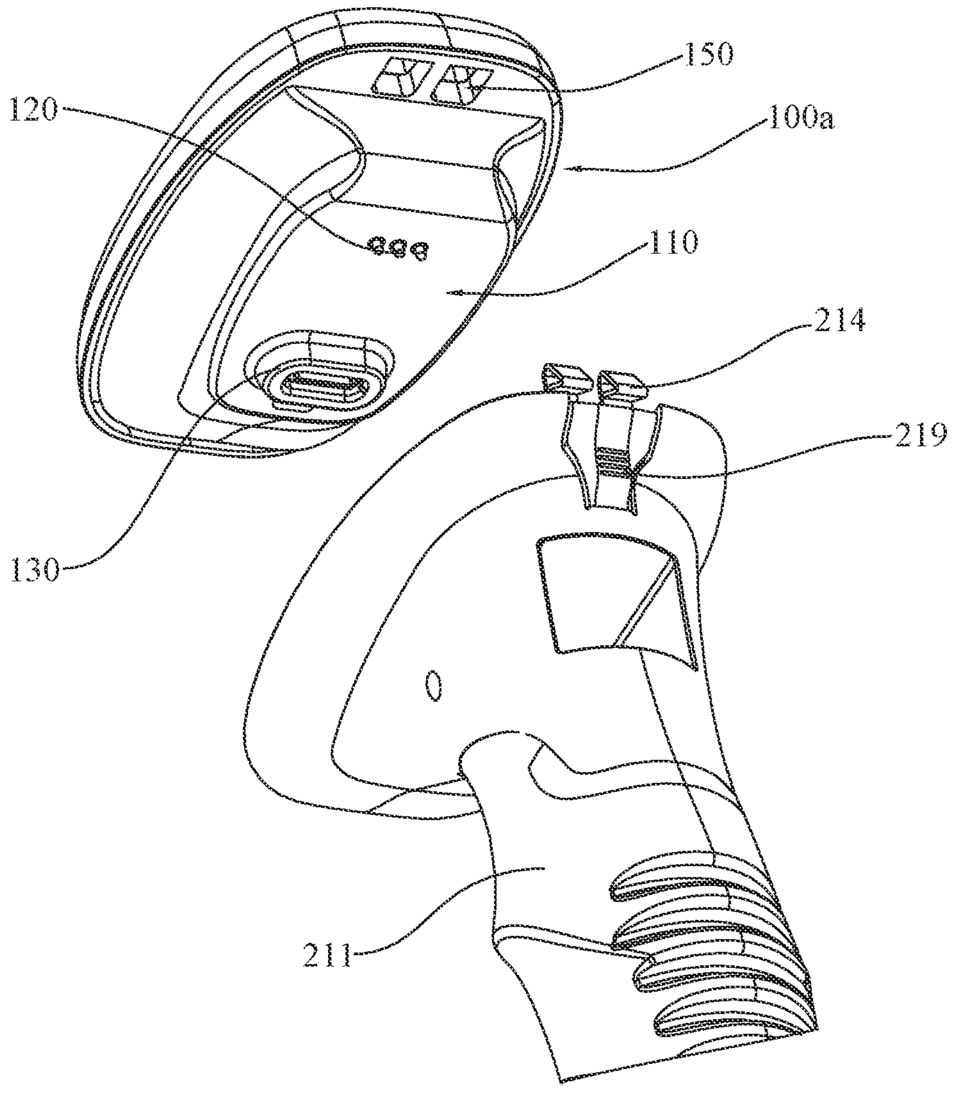
FIG. 3 is an isometric exploded view of the handle of the illuminated walking cane in FIG. 2, viewed from another aspect.

Embodiments of the present disclosure will be described in detail in conjunction with the drawings. It should be noted that the figures are illustrative rather than limiting. The figures are not drawn to scale, do not illustrate every aspect of the described embodiments, and do not limit the scope of the present disclosure.

In the description of the disclosure, it should be understood that orientation or position relationships indicated by the terms such as "center", "above", "below", "left", "right", "vertical", "horizontal", "inside", and "outside" are based on orientation or position relationships shown in the accompanying drawings, and are used only for ease and brevity of illustration and description of the disclosure, rather than indicating or implying that the mentioned apparatus or component must have a particular orientation or must be constructed and operated in a particular orientation. Therefore, such terms should not be construed as limiting of the disclosure. In addition, the terms "first" and "second" are used for descriptive purposes only and are not to be construed as indicating or implying relative importance or implicitly indicating the number of technical features indicated. Therefore, features defining "first" and "second" may explicitly or implicitly include one or more such features. In creative descriptions of the disclosure, "a plurality of" means two or more, unless otherwise stated.

Walking cane have lights when used at night. In order to supply power to the lights, a replaceable cylindrical battery is installed in the walking cane for power supply, the other is to use a rechargeable interface to supply power to the battery in the walking cane. Rainwater is easy to enter the charging port and cause the circuit in the cane to be short-circuited and burned out. The safety performance of the cane is low and the service life is not long.

Detailed reference will now be made to one or more potential embodiments of the disclosure, which are illustrated in FIGS. 1 through 8, various views of an illuminated walking cane 10 for emitting light. One example embodiment provides the illuminated walking cane 10 for assisting movement, which provides light in a generally downward direction toward the feet of a user. The illuminated walking cane 10 provides circumferential lighting to illuminate areas in front of, to the sides of, and behind the walking aid, allowing for suitable movement over uneven terrain commonly encountered when hiking, climbing or skiing. The illuminated walking cane 10 may also be used as a signaling device or for pointing and illuminating objects in the surrounding vicinity, for example.

In the present disclosure, the illuminated walking cane 10 has three major components, a handle 100, a cane pole component 200 and a ground-engaging tip 212. The handle 100 100 is attached to an upper end of cane pole component 200 and the ground-engaging tip 212 is attached to a lower end of cane pole component 200. In normal use, a user grips a head body 100*a* of the handle 100 with one hand and the ground-engaging tip 212 presses against the ground or other surface on which the user is walking. The cane pole component 200 has an elongate stick 210 and a gripping sleeve 210*a* connected with the elongate stick 210 for supporting the handle 100. The clamping sleeve 210*a* is wrapped at the end of the elongate stick 210 along the direction of the stick, and has a convex rib which can be grasped by the hand. A light 300 is mounted on the cane pole component 200 and forward to project light onto the ground in front of the user so that the user can better see the ground where they are going to place foot 201. The light 300 can be any form of light source such as, for example, LED, incandescent, florescent, or other light source. Some examples include one or more lights that are resistant to shock, such as an LED light. The LED light is positioned on the elongate stick 210 to direct light outwardly through a diffuser positioned around the LED light.

In the embodiment, the handle 100 has a supporting seat 211 with a recessed cavity 211*b*, a battery assembly 20 received in the cavity 211*b* and an upper shell 10*a* covered on the battery assembly 20 for waterproofing. The supporting seat 211 is connected to the elongate stick 210 and supported by the gripping sleeve 210*a*, and has a main shell 211*a* which forms the cavity 211*b*. The opening of the cavity 211*b* is upwardly open to facilitate the detachable mounting of the battery assembly 20. The upper shell 10*a*, the battery assembly 20, and the main shell 211 form the main part of the handle 100 that can be grasped by a hand, which is configured to support palm-down pressure.

The battery assembly 20 has a bottom shell 10*b* in the shaped of a hull matched with the cavity 211*b* of the supporting seat 211, a frame 20*b*, a battery unit 20*a* mounted on the frame 20*a*, a touch switcher 20*d* mounted on the frame 20*b* and a printed circuit board assembly (PCBA) 20C with a charging port 130. In the embodiment, the touch switcher 20*d* is arranged on the upper surface of the frame 20*b*, the PCBA 20*c* is arranged on the lower surface of the frame 20*b*, and the touch switcher 20*d* is connected to the PCBA 20*c* via a wire 20*e* such as a flexible circuit board (FPC) to achieve electrical conduction. The PCBA 20*c* is further provided with an elastic conductive terminals. Correspondingly, the bottom shell 10*b* is provided with a first hole matched with the elastic conductive terminal and a second hole 131 matched with a charging port 130. In the embodiment, the charging port 130 is a USB (Uniform Serial Bus) plug.

In the embodiment, the frame 20*b* and the battery unit 20*a* are accommodated in a battery compartment 215 formed by the bottom shell 10*b*, and the upper shell 10*a* covers the battery compartment 215 and is connected to the bottom shell 10*b*. The upper shell 10*a* and the bottom shell 10*b* form an egg shape which is convenient for the palm to grasp. The upper shell 10*a* has a main portion 12 and a detachable auxiliary portion 11 corresponding to a power-pressing indicating button 11*d* corresponding to the touch switcher 20*d* of the battery assembly 20. The thickness of the auxiliary portion 11 is thinner than that of the main portion 12, which is convenient to make the power-pressing indicating button 11*d* have a pressing elasticity. Specifically, the auxiliary portion 11 includes a covering portion 11*a* made of a flexible plastic face board, a buckle portion 11*c* which may be buckled in the central area of the main portion 12, and a bridge 11*b* extending between the covering portion 11*a* and the buckle portion 11*c*. It can be understood that the covering portion 11*a* and the buckle portion 11 are arranged on one side of the main portion 12, and the bridge is arranged on the other side of the main portion 12. Equivalently, the covering portion 11*a* and the buckle portion 11*c* take the bridge 11*b* as a stress fulcrum. The power-pressing indicating button 11*d* is provided on the covering portion 11*a* and is relative to the palm area of the hand, so that user can easily press the touch switch 20*d* with the palm. In order for the main portion 12 and the auxiliary portion 11 to form a coplanar surface. The main portion 12 is provided with a depressed area 12*a* corresponding to the covering portion 11*a*, a clamping area corresponding to the buckle portion 1*c*, and a groove 12*b* receiving the bridge 11*b*. A concave hole 12*d* corresponding to the power-pressing indicating button 11*d* is provided in the depressed area 12*a*, so as to provide enough deformation space for the power-pressing indicating button 11*d* to be able to touch the touch switcher 20*d* of the battery assembly 20. It can be seen that, in the present disclosure, the triggering of the light 300 is realized by activating the battery assembly 20 via the power-pressing indicating button 11*d* located on the top of the handle 100. The upper shell 10*a* forms an arc-shaped cover with the button 11*d* through the cooperation of the main portion 12 and the auxiliary portion 11, which may effectively prevent rainwater from entering the battery compartment 215.

Figure 4:
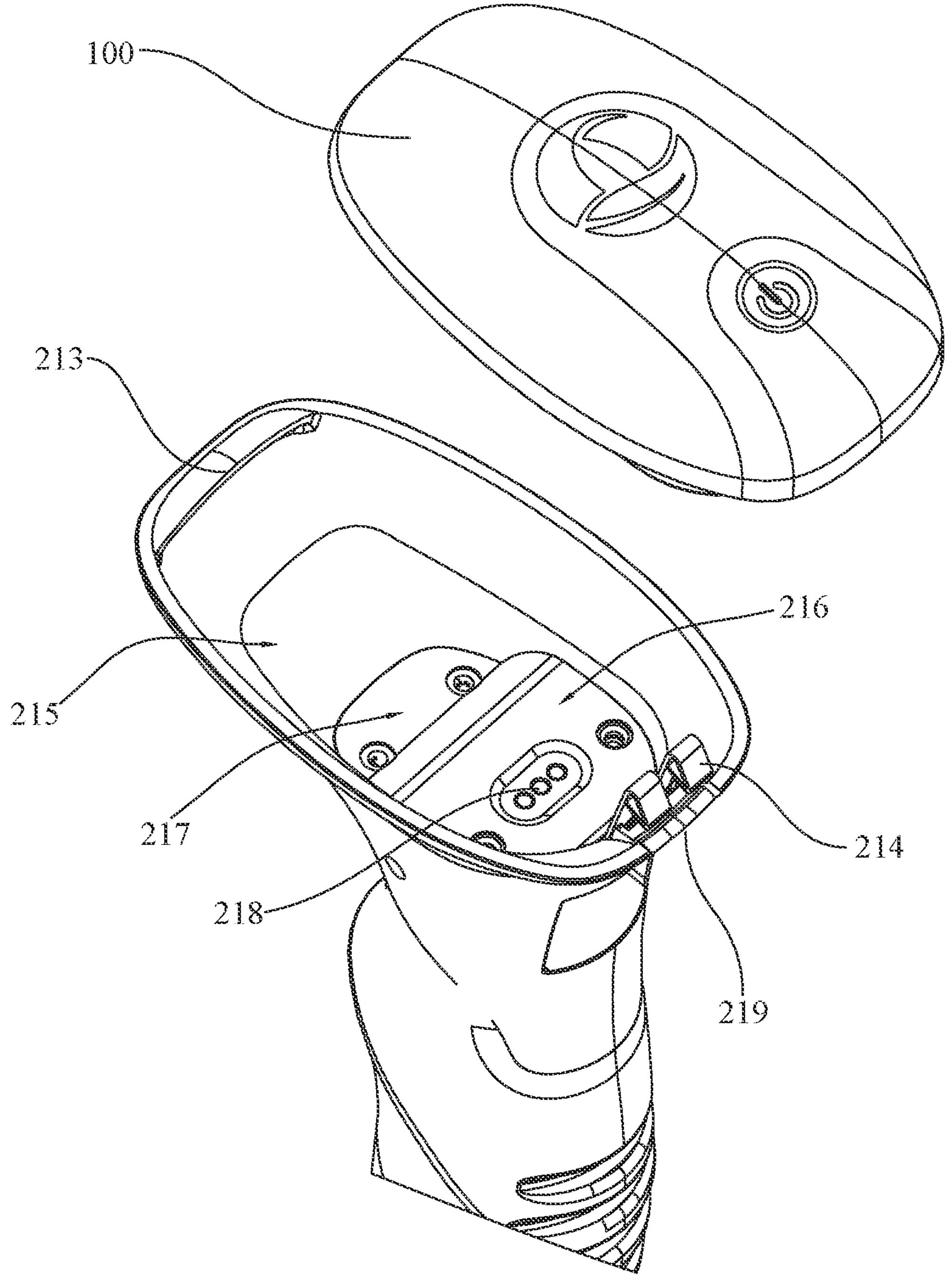
FIG. 4 is an isometric exploded view of the handle of the illuminated walking cane in FIG. 2, with the battery unit and the frame thereof being removed away.
Figure 5:
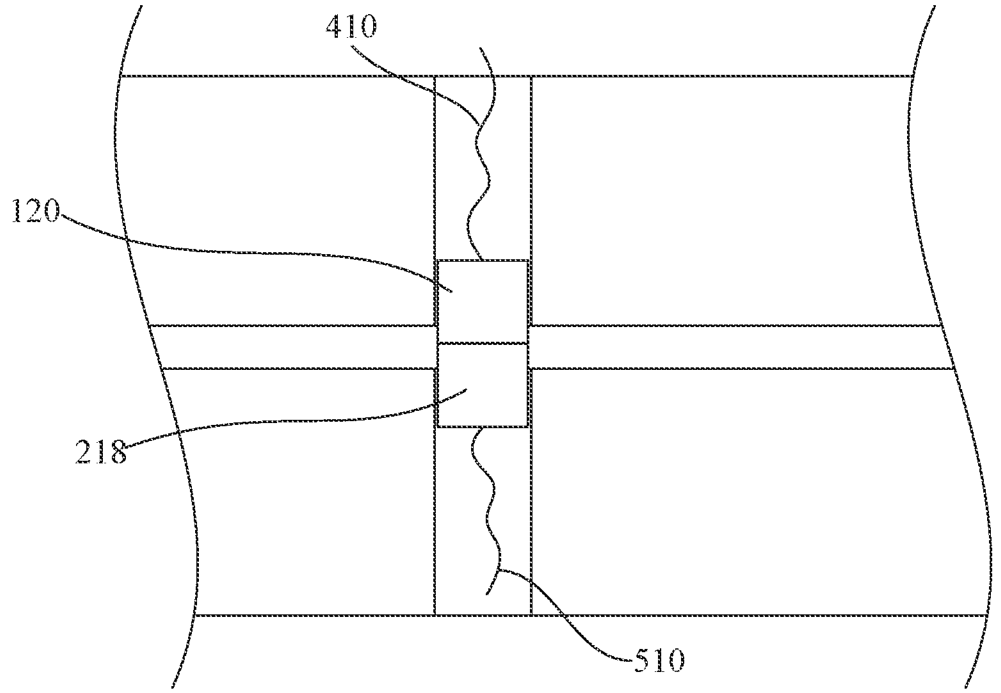
FIG. 5 is a cross-sectional view of a portion of elastic conductive terminal of the battery assembly in FIG. 2.
Figure 6:
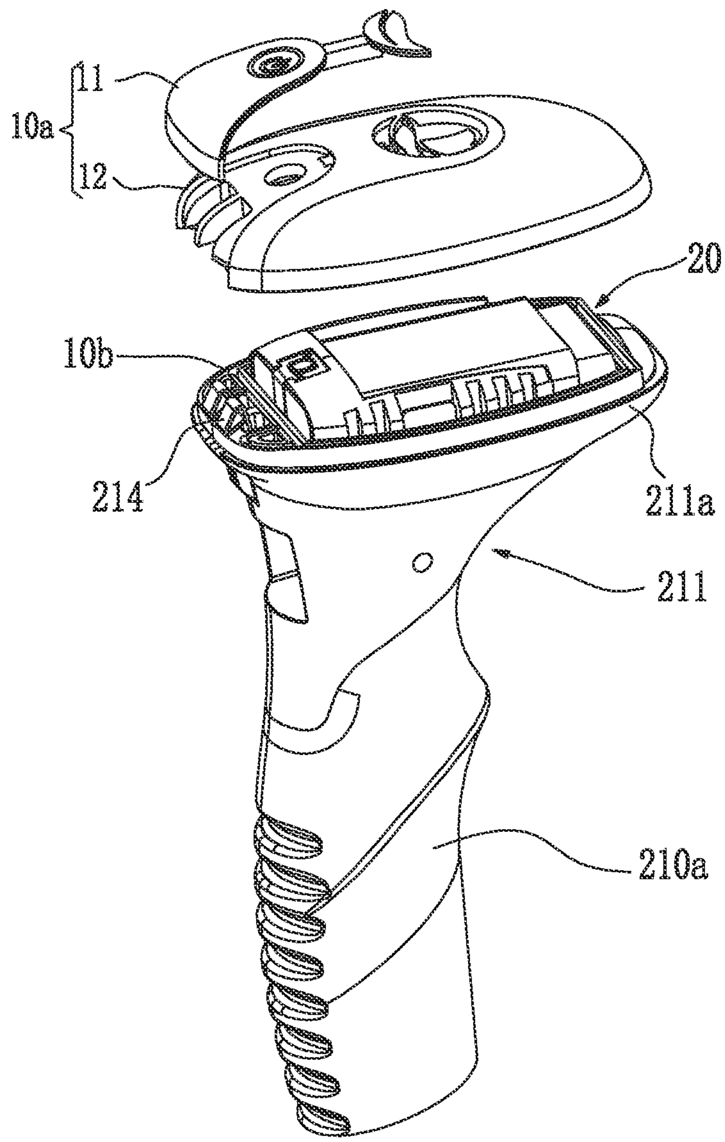
FIG. 6 is an isometric exploded view of the handle of the illuminated walking cane in FIG. 2, with a gripping sleeve thereof being removed away, viewed from another aspect.
Figure 7:
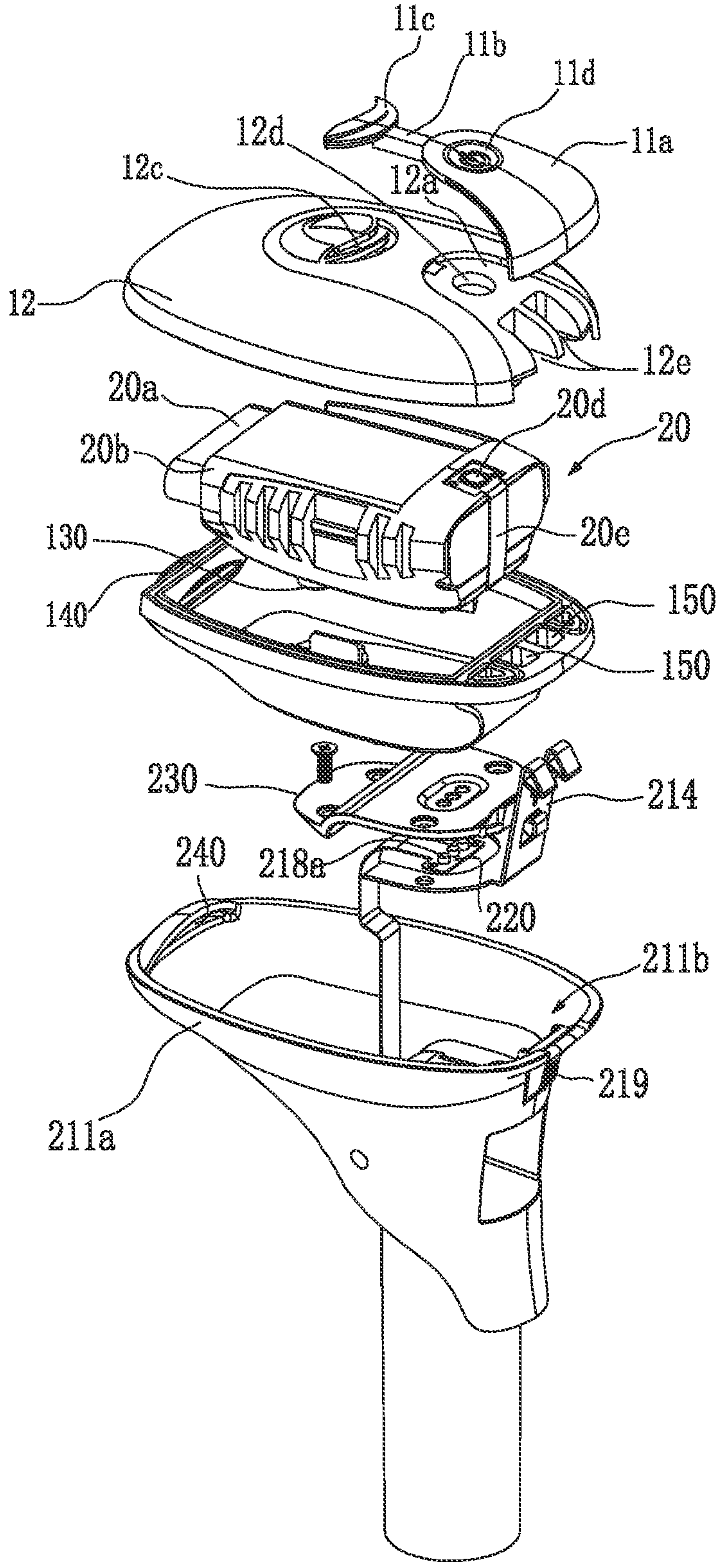
FIG. 7 is an isometric exploded view of the handle of the illuminated walking cane in FIG. 6, viewed from another aspect.
Figure 8:
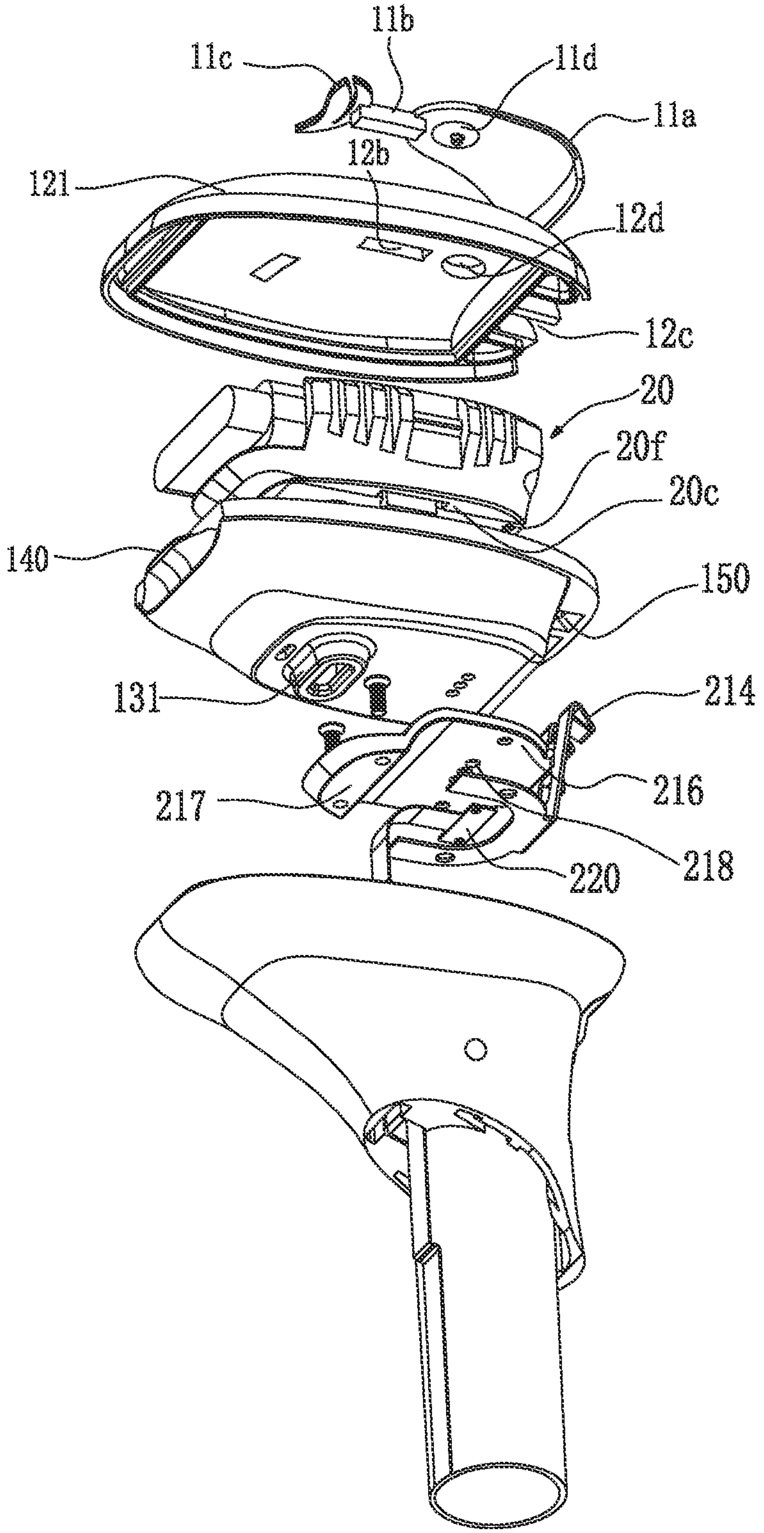
FIG. 8 is an isometric exploded view of the handle of the illuminated walking cane in FIG. 7, viewed from another aspect.

In the embodiment, The bottom shell 10*b* is supported by the main shell 211*a* of the supporting seat 211. Specifically, the bottom shell 10*b* is received in the cavity 211*b* of the supporting seat 211, and the edge of the hull-shaped bottom shell 10*b* are supported by the edge of the main shell 211*a* and connected to each other. Thus, a space is formed between the bottom shell 10*b* and the bottom shell 10*b* of the supporting seat 211. In order to protect the charging port 131 and the elastic conductive terminals located at the bottom of the bottom shell 10*b*, a plate 230 is located in the space. The plate 230 is fixed in the main shell 211*a* of the supporting seat 211 by screws. The plate 230 has a first portion 217 facing the charging port 131 and a second portion 216 facing the elastic conductive terminal. In additional, a third hole 218 is provided on the plate 230 and corresponding to the first hole of the bottom shell 10*b*. Therefore, the conductive terminal at least may pass through the first hole. A flexible lead 220 is attached to the plate 230 for electrical connection between the light 300 and the conductive terminals. The flexible lead 200 has a terminal for electrical connecting the elastic conductive terminal provided on the bottom of the battery assembly 20, and a leading wire mounted on the elongate stick 210. Referring to FIG. 4, the elastic conductive terminal of the battery assembly 20 has a terminal 120 and a spring 410. Similarly, the terminal of the flexible lead 200 has a metal end 218*a* and a spring 510.

In additional, in order to enable the battery assembly 20 to be detachably arranged on the supporting seat 211, an elastic metal buckle 214 is provided in the recessed cavity 211*b* of the supporting seat 211 for hooking one side of the battery assembly. In other embodiment, the elastic metal buckle 214 passes through the bottom shell 10*b* of the battery assembly 20 and hooks the upper shell 10*a*. Correspondingly, the battery assembly 20 is provided with a groove 150 for receiving the elastic metal buckle 214. Specially, the elastic metal buckle 214 has a base mounted on the main shell 211*a* and an elastic arm extending upward from the base. A barb is provided at the end of the elastic arm. The groove 150 is provided on the edge of the bottom shell 10*b* of the battery assembly 20. A gap 12*e* corresponding to the groove 150 is provided on the upper shell 10*a*. In the embodiment, the gap 12*e* is provided on the main portion 12, and the auxiliary portion 11 covers the gap 12*e*. On the other side of the handle 100, the edge of the main shell 211*a* of the supporting seat 211 has a mouth 240. Specifically, a narrow shed 213 extends from the edge of the main shell 211*a* to form the mouth 240. A tab 140 extends from the bottom shell 10*b* for received within the mouth 240. In additional, the main shell 211*b* is further provided with an elastic pressing member 219 which may elastically resist the elastic arm of the elastic metal buckle 214.

While assembled, the upper shell 10*a* and the bottom shell 10*b* of the battery assembly 20 are matched and connected to form an integral piece 100*a*, which is supported by the supporting seat 211 and accommodated in the recessed cavity 211*b* of the supporting seat 211. The top surface of the upper shell 10*a* is provided with the power-pressing indicating button 11*d*, and the bottom of the bottom shell 10*b* is provided with the charging port and the elastic conductive terminal. The elastic conductive terminal is electrically connected with the flexible lead 220 so as to realize the work of the light 300 on the cane 10. The elastic arm of the elastic metal buckle 214 fixed in the recessed cavity 211*b* of the support seat 211 passes through the groove 150 on the bottom shell 10*b* of the battery assembly 20 and extends into the gap 12*e* on the upper shell 10*a*, and the barb of the elastic arm hooks the upper shell 10*a* so that one side of the upper shell 10*a* and the battery assembly 20 is snapped on the supporting seat 211. On the other side, the protruding tab 140 on the bottom shell 10*b* is snapped onto the mouth 240 on the supporting seat 211, so that the entire battery assembly 20 connected to the upper shell 10*a* is securely loaded on the supporting seat 211. Since the charging port 131 is provided at the bottom and is located in the space formed by the bottom shell 10*b* and the supporting seat 211, it may not be wetted by rain, which enhances safety.

When removing the battery assembly 20 from the cane 10. Pressing the elastic pressing member 219 on the support seat 211 causes the elastic arm of the elastic metal buckle 214 to be displaced, and the barb of the elastic arm is disengaged from the upper shell 10*a*, so that the battery assembly 20 together with the upper shell 10*a* may be moved.

In the present disclosure, The battery assembly 20 together with the upper shell 10*a* seals the battery unit 20*a* into the inner battery compartment 215, forming a hull shape that can be grasped by hand. The bottom of the battery assembly 20 is provided with the charging port 131 and conductive terminals. The supporting base is provided with the flexible lead 220 electrically connected to the conductive terminals. The bottom shell 10*b* of the battery assembly 20 and the edge of the main shell 211*b* of the supporting seat 211 are connected to form a sealed space, and the charging port 131 is located in the sealed space.

While the present disclosure has been described with reference to a specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

What is claimed is:

1. An illuminated walking cane comprising:

a cane pole component having a ground-engaging tip at a first end and a handle at an opposing second end, a light mounted on the cane pole component; and wherein the handle has a supporting seat with a recessed cavity, a battery assembly with a conductive terminal accommodated in the recessed cavity and an upper shell covering the battery assembly so that the upper shell and the battery assembly form an integral piece which may be grasped by hand and may be detached from the supporting seat;

a power-pressing indicating button is provided on the top surface of the upper shell;

the battery assembly has a bottom shell, a battery unit and a charging port provided on the bottom of the battery assembly;

the edge of the bottom shell is supported and connected by the edge of the supporting seat to form a space for receiving the charging port of the battery assembly;

a plate is arranged in the recessed cavity of the supporting seat and facing the charging port;

a flexible lead with metal terminal is mounted on the plate, the conductive terminal of the battery assembly is elastically and electrically connected with the metal terminals of the flexible lead.

2. The illuminated walking cane as described in claim 1, wherein the upper shell has a main portion and an auxiliary portion matched with the main portion, the power-pressing indicating button is provided on the auxiliary portion.

3. The illuminated walking cane as described in claim 2, wherein the auxiliary portion includes a covering portion, a buckle portion which may be buckled in the central area of the main portion, and a bridge extending between the covering portion and the buckle portion, the power-pressing indicating button is provided on the covering portion.

4. The illuminated walking cane as described in claim 3, wherein the covering portion and the buckle portion are arranged on one side of the main portion, the bridge is arranged on the other side of the main portion, and the covering portion and the buckle portion take the bridge as a stress fulcrum.

5. The illuminated walking cane as described in claim 1, wherein the battery assembly further has a touch switcher provided on one side of the battery unit, a PCBA with the charging port provided on the other side of the battery unit, a FPC extending between the touch switcher and the PCBA.

6. The illuminated walking cane as described in claim 5, wherein the touch switcher is located under the power-pressing indicating button so that the touch switcher may be triggered by hand via the power-pressing indicating button.

7. The illuminated walking cane as described in claim 1, wherein the bottom shell is in the shaped of a hull.

8. The illuminated walking cane as described in claim 1, wherein an elastic metal buckle is provided in the recessed cavity of the supporting seat for hooking one side of the battery assembly.

9. The illuminated walking cane as described in claim 8, wherein the elastic metal buckle has a base mounted on a main shell of the supporting seat, an elastic arm extending upward from the base and a barb provided at the end of the elastic arm.

10. The illuminated walking cane as described in claim 9, wherein a groove is provided on the edge of the bottom shell of the battery assembly for accommodating the elastic arm to pass through.

11. The illuminated walking cane as described in claim 10, wherein a gap corresponding to the groove is provided on the upper shell for accommodating the elastic metal buckle.

12. The illuminated walking cane as described in claim 9, wherein the main shell is further provided with an elastic pressing member which may elastically resist the elastic arm of the elastic metal buckle so that the elastic metal buckle is detached from the battery assembly.

13. The illuminated walking cane as described in claim 9, wherein a narrow shed extends from the main shell to form a mouth arranged on the main shell for a portion of the battery assembly.

14. The illuminated walking cane as described in claim 13, wherein the narrow shed extends from the edge of main shell away from the elastic metal buckle for forming the mouth.

* * * * *